United States Patent
Tozer et al.

(10) Patent No.: US 11,927,359 B2
(45) Date of Patent: Mar. 12, 2024

(54) ENERGY RECOVERY VENTILATOR WITH BYPASS

(71) Applicant: Carrier Corporation, Palm Beach Gardens, FL (US)

(72) Inventors: Renee Tozer, Liverpool, NY (US); Eberhard Schmidt, Palm Beach Gardens, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/075,196

(22) Filed: Dec. 5, 2022

(65) Prior Publication Data

US 2023/0175727 A1  Jun. 8, 2023

Related U.S. Application Data

(60) Provisional application No. 63/285,819, filed on Dec. 3, 2021.

(51) Int. Cl.
*F24F 12/00* (2006.01)

(52) U.S. Cl.
CPC ...... *F24F 12/006* (2013.01); *F24F 2012/007* (2013.01); *F24F 2203/104* (2013.01); *F24F 2221/16* (2013.01)

(58) Field of Classification Search
CPC .............. F24F 12/006; F24F 2012/007; F24F 2203/104; F24F 2221/16
USPC .......................................................... 165/8
See application file for complete search history.

(56) References Cited

U.S. PATENT DOCUMENTS

| | | | |
|---|---|---|---|
| 5,548,970 | A | 8/1996 | Cunningham et al. |
| 6,016,710 | A | 1/2000 | Boles et al. |
| 6,328,095 | B1 | 12/2001 | Felber et al. |
| 6,751,964 | B2 | 6/2004 | Fischer |
| 7,150,314 | B2 | 12/2006 | Moffitt |
| 7,753,766 | B2 | 7/2010 | Matser et al. |
| 9,777,941 | B2 | 10/2017 | Grimaldi et al. |
| 9,816,724 | B2 | 11/2017 | Phannavong et al. |
| 9,907,214 | B2 | 2/2018 | Dagley et al. |
| 10,197,344 | B2 | 2/2019 | McKie et al. |
| 10,364,995 | B2 | 7/2019 | Fischer et al. |
| 10,584,884 | B2 | 3/2020 | Coutu et al. |
| 10,598,398 | B2 | 3/2020 | Wiley et al. |
| 10,823,447 | B2 | 11/2020 | McKie et al. |

(Continued)

FOREIGN PATENT DOCUMENTS

| | | |
|---|---|---|
| CN | 102889650 B | 1/2015 |
| WO | 2012011865 A2 | 1/2012 |

*Primary Examiner* — Steve S Tanenbaum
(74) *Attorney, Agent, or Firm* — Kinney & Lange, P. A.

(57) ABSTRACT

A rooftop HVAC unit includes a cabinet, an energy recovery wheel, dampers, and a controller. The energy recovery wheel is configured to be mounted within the cabinet. The energy recovery wheel is configured to transfer heat between an outdoor air stream and a return air stream when in an operational mode, and is further configured not to transfer heat between the outdoor air stream and the return air stream when in a bypass mode. The dampers can direct the outdoor air stream and return air stream through the rooftop HVAC unit, either through the energy recovery wheel or around the energy recovery wheel. The controller is configured to adjust the dampers based on a selection between the operational mode and bypass mode of the energy recovery wheel.

20 Claims, 12 Drawing Sheets

(56) References Cited

U.S. PATENT DOCUMENTS

| | | |
|---|---|---|
| 10,989,434 B2 | 4/2021 | Nanjappa et al. |
| 11,041,679 B2 | 6/2021 | Ramanujam et al. |
| 11,073,301 B2 | 7/2021 | Singh et al. |
| 2015/0096714 A1* | 4/2015 | Dagley .............. H05K 7/20836 165/8 |
| 2017/0016646 A1 | 1/2017 | Lee |
| 2019/0063780 A1 | 2/2019 | Puttagunta et al. |
| 2020/0116372 A1 | 4/2020 | Fischer |
| 2020/0263899 A1 | 8/2020 | Sethuraj et al. |
| 2021/0071891 A1 | 3/2021 | Ferrere et al. |

* cited by examiner

US 11,927,359 B2

ENERGY RECOVERY VENTILATOR WITH BYPASS

CROSS-REFERENCE TO RELATED APPLICATION(S)

This application claims the benefit of U.S. Provisional Application No. 63/285,819 filed Dec. 3, 2021 for "ENERGY RECOVERY VENTILATOR WITH BYPASS" by R. Tozer and E. Schmidt, the disclosure of which is incorporated by reference into this application in its entirety.

BACKGROUND

The present description relates generally to rooftop heating, ventilation, and air conditioning (HVAC) units, and more particularly to an energy recovery ventilator (ERV) system for a modified rooftop HVAC unit.

There is a need to recover energy from the conditioned air leaving the building (whether it be heating or cooling), for example, via the rooftop HVAC unit. However, conventional rooftop HVAC units may lack the space necessary to incorporate ERV systems. This makes traditional retrofits difficult and may require the movement or resizing of various components or other layout changes.

SUMMARY

According to one aspect of the invention, a rooftop HVAC unit includes a cabinet, an energy recovery wheel, a plurality of dampers, and a controller. The energy recovery wheel is configured to be mounted within the cabinet. The energy recovery wheel is configured to transfer heat between an outdoor air stream and a return air stream when in an operational mode, and is further configured not to transfer heat between the outdoor air stream and the return air stream when in a bypass mode. The plurality of dampers are configurable to direct the outdoor air stream and the return air stream through the rooftop HVAC unit, either through the energy recovery wheel or around the energy recovery wheel. The controller is configured to adjust the dampers based on a selection between the operational mode and bypass mode of the energy recovery wheel.

According to another aspect of the present invention, a method of operating a rooftop HVAC unit includes selecting, with a controller, an operational mode of an energy recovery wheel. The rooftop HVAC unit includes the energy recovery wheel and a plurality of dampers. The plurality of dampers is configured to direct an outdoor air stream and an indoor air stream through the energy recovery wheel to transfer heat between the outdoor air stream and the return air stream. The controller selects a bypass mode of the energy recovery wheel. The plurality of dampers is configured to direct the outdoor air stream and the indoor air stream around the energy recovery wheel to minimize the transfer of heat between the outdoor air stream and the return air stream.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way.

DETAILED DESCRIPTION

An energy recovery ventilator system is included within a cabinet of a rooftop HVAC unit which has been modified to include streamlined components. An energy recovery wheel in the energy recovery ventilator system is located between separated airway streams. A system of dampers allows air to be directed around the energy recovery wheel, preserving airway separation when the energy recovery wheel is not operating.

Figure 1A:
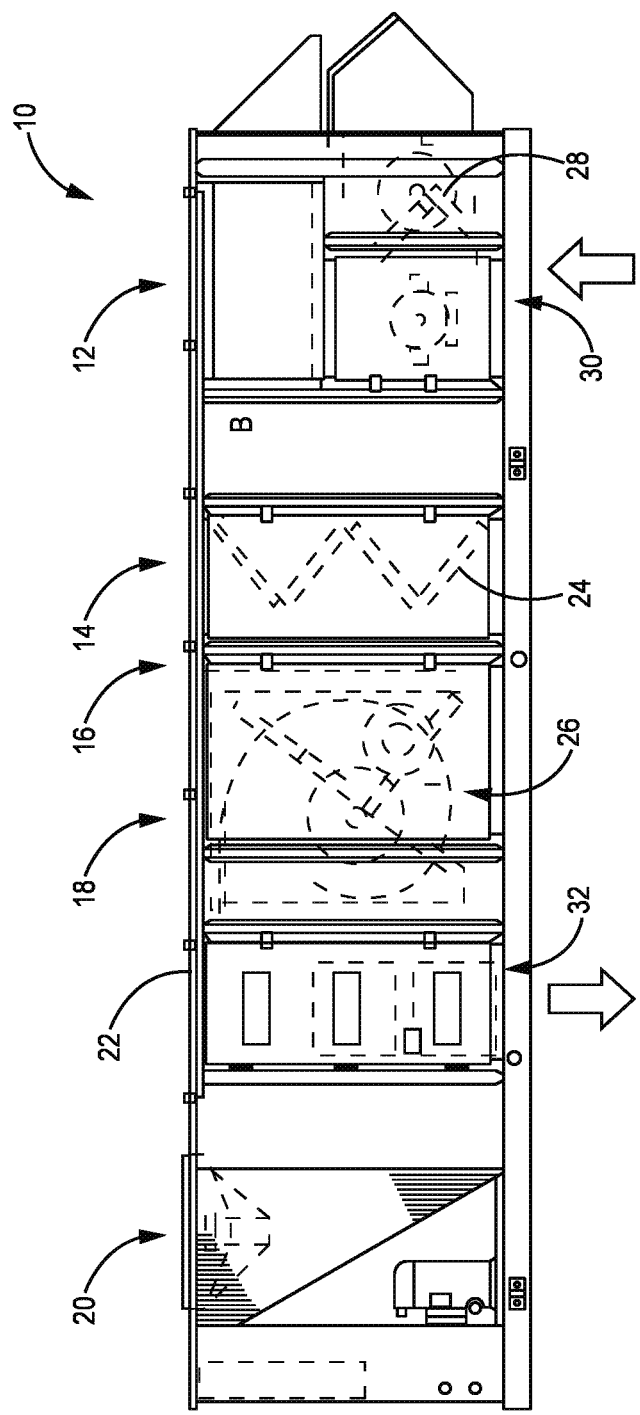
FIG. 1A is a cross-sectional view of a prior art rooftop HVAC unit.

FIG. 1A is a cross-sectional view of exemplary prior art HVAC unit 10. As shown, prior art HVAC unit 10 is a rooftop HVAC unit which can include exhaust section 12, filter section 14, evaporative coil section 16, supply/heating section 18, and condensing section 20. Prior art HVAC unit 10 can include components such as cabinet 22, filters 24, supply fan 26, and exhaust fan 28. Cabinet 22 can include return inlet 30 and supply inlet 32.

Exhaust section 12 can be located upstream of filter section 14, evaporative coil section 16, and supply/heating section 18 with respect to airflow through prior art HVAC unit 10. Condensing section 20 can be located adjacent to supply/heating section 18 such that supply/heating section 18 is located between evaporative coil section 16 and condensing section 20. Cabinet 22 is a housing which surrounds the other components of prior art HVAC unit 10. Filters 24 can be located within filter section 14. Supply fan 26 can be disposed downstream of exhaust fan 28 with respect to the flow of outdoor air through cabinet 22. Filters 24 can be located upstream of supply fan 26. Exhaust fan 28 can be disposed upstream of supply fan 26 and filters 24, such that filters 24 are located between exhaust fan 28 and supply fan 26. During operation, return air can enter cabinet 22 at return inlet 30 within exhaust section 12. Return air can flow through filter section 14, evaporative coil section 16, and supply/heating section 18 and exit cabinet 22 at supply inlet 32 as re-conditioned supply air.

In the depicted example, supply fan 26 draws supply air through cabinet 22. Supply fan 26 can draw outdoor air in through prior art HVAC unit 10. Filters 24 can filter return air flowing through filter section 14. Exhaust fan 28 can draw return air into and through cabinet 22. Exhaust fan 28 can discharge return air outside of the building. During operation, prior art HVAC unit 10 provides ventilation to a building, and can additionally provide heating and/or cooling. A number of dampers (not shown in FIG. 1) within cabinet 22 can be configurable to select airflow source and flow rate for prior art HVAC unit 10.

Figure 1B:
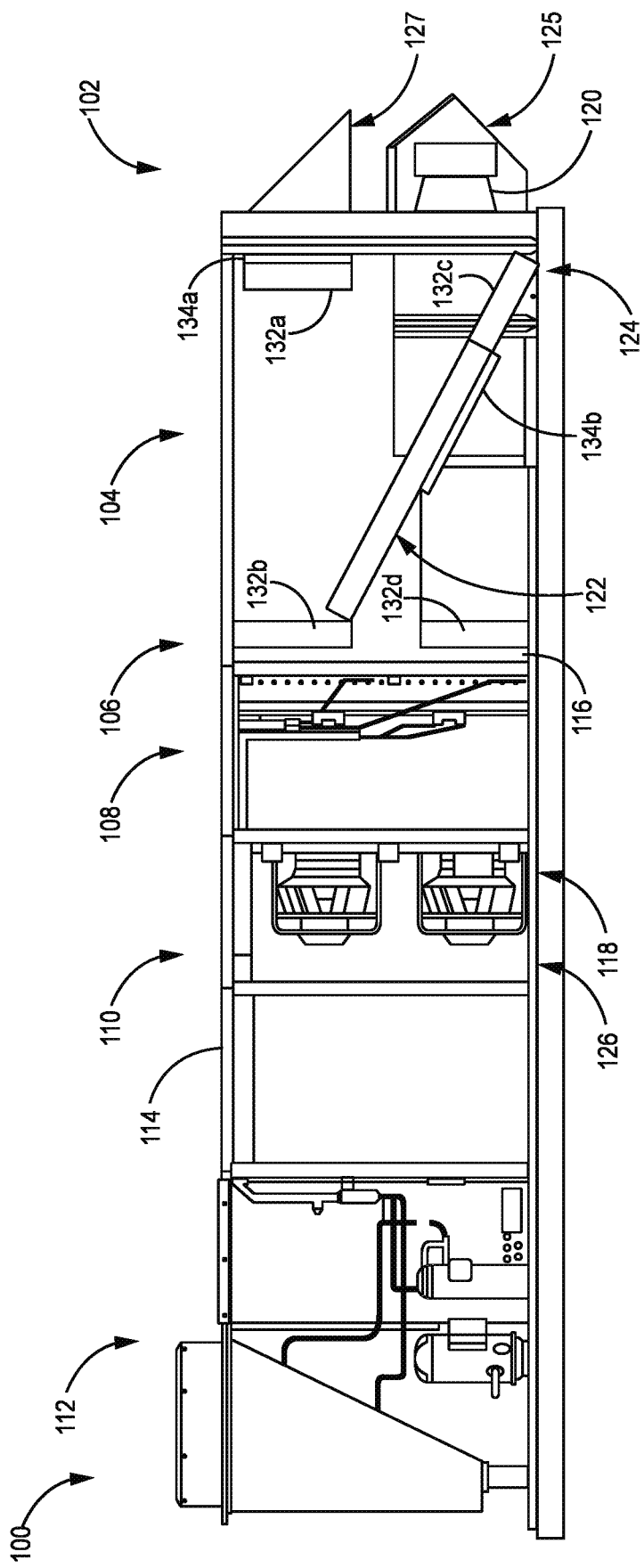
FIG. 1B is a cross-sectional view of an exemplary first embodiment of a modified rooftop HVAC unit including an energy recovery ventilator (ERV) system.

FIG. 1B is a cross-sectional view of exemplary modified HVAC unit 100. Modified HVAC unit 100 is a rooftop HVAC unit which can include exhaust section 102, energy recovery section 104, filter section 106, evaporative coil section 108, supply/heating section 110, and condensing section 112. Modified HVAC unit 100 can include components such as cabinet 114, filters 116, supply fan 118, exhaust fan 120, and energy recovery wheel 122. Cabinet 114 can include return inlet 124, exhaust outlet 125, supply outlet 126, and supply inlet 127. As described in more detail below in reference to FIGS. 3-6, modified HVAC unit 100 can include supply inlet damper 132a, supply outlet damper 132b, exhaust outlet damper 132c, and return outlet damper 132d, as well as filters 134a-134b.

Modified HVAC unit 100 can operate in substantially the same way as prior art HVAC unit 10 with respect to ventilation. Exhaust fan 120 can be positioned at an end of cabinet 114 and oriented parallel to the cross section shown in FIG. 1B with respect to an axis of rotation of exhaust fan 120. Modified HVAC unit 100 can be a vertical HVAC unit and can thereby utilize vertical return.

In comparison to prior art HVAC unit 10 described above, certain components of modified HVAC unit 100 can be resized or moved. With respect to the location of filters 24 within prior art HVAC unit 10, filters 116 of modified HVAC unit 100 have been rotated 90 degrees to create room within cabinet 114. With respect to the size and location of exhaust fan 28 within prior art HVAC unit 10, exhaust fan 120 of modified HVAC unit 100 has been moved to an end of cabinet 114 and has been flattened. These modifications provide space for energy recovery section 104 within cabinet 114 while allowing cabinet 114 to be the same size as cabinet 22. As discussed in more detail below, energy recovery wheel 122 allows modified HVAC unit 100 to transfer heat energy between the outdoor air and the return air.

Figure 2B:
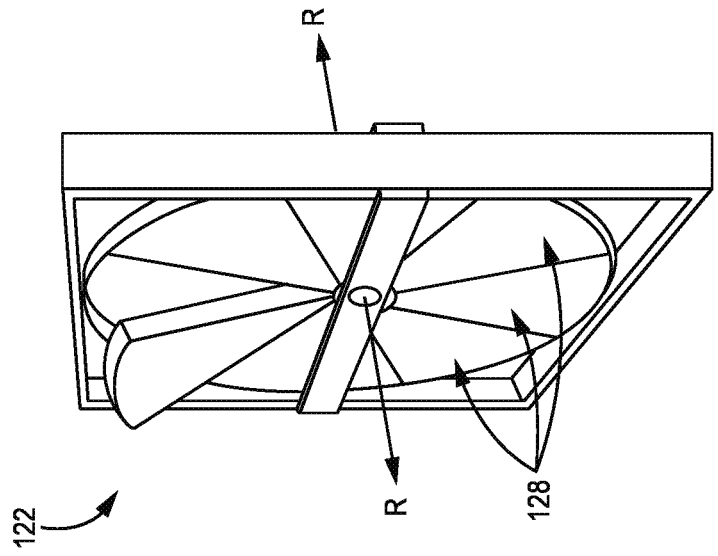
FIG. 2B is a side perspective view of the energy recovery wheel of FIG. 2A showing a partially-removed cassette.
Figure 2A:
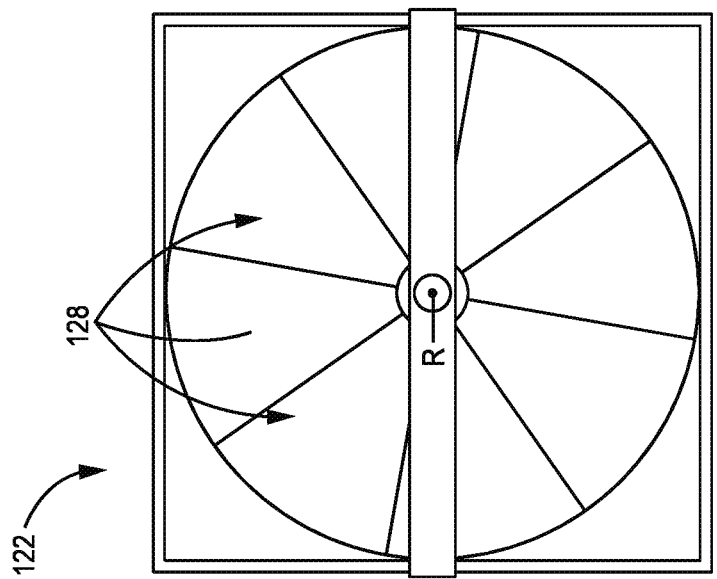
FIG. 2A is a front perspective view of an exemplary energy recovery wheel.

FIG. 2A is a front perspective view of exemplary energy recovery wheel 122. FIG. 2B is a side perspective view of exemplary energy recovery wheel 122. FIGS. 2A and 2B will be discussed together. In the example depicted in FIGS. 2A-2B, energy recovery wheel 122 includes cassettes 128. Energy recovery wheel 122 can be rotatable about a rotational axis, such as operational axis R-R.

Each cassette 128 includes a heat exchanger which allows energy recovery wheel 122 to transfer heat energy between two air sources. The two air sources can be, for example, outdoor air and return air. Cassettes 128 can be removable from energy recovery wheel 122, allowing for an individual cassette 128 to be serviced, replaced, or otherwise maintained. Energy recovery wheel 122 can be positioned so as to transfer heat between outdoor air and return air. This can be achieved by, for example, positioning energy recovery wheel 122 in both the outdoor air stream and the return air stream. Energy recovery wheel 122 can be rotated about operational axis R-R such that cassettes 128 are successively moved between the outdoor air stream and the return air stream. Each cassette 128 can thereby absorb heat from the warmer of the outdoor air stream and the return air stream and reject heat into the cooler of the outdoor air stream and the return air stream. For example, if the outdoor air is warmer than the return air, each cassette 128 can absorb heat from the outdoor air during the period of rotation when the cassette 128 is in contact with the outdoor air stream. The cassette 128 can then reject heat into the return air during the period of rotation when the cassette 128 is in contact with the return air stream. Energy recovery wheel 122 can be in heating mode when transferring heat energy from the return air stream to the outdoor air stream. Energy recovery wheel 122 can be in cooling mode when transferring heat energy from the outdoor air stream to the return air stream. When installed within a cabinet, such as cabinet 114 of FIG. 1B, energy recovery wheel 122 can be rotated about operational axis R-R to transfer heat energy between the outdoor air stream and the return air stream.

Figure 3:
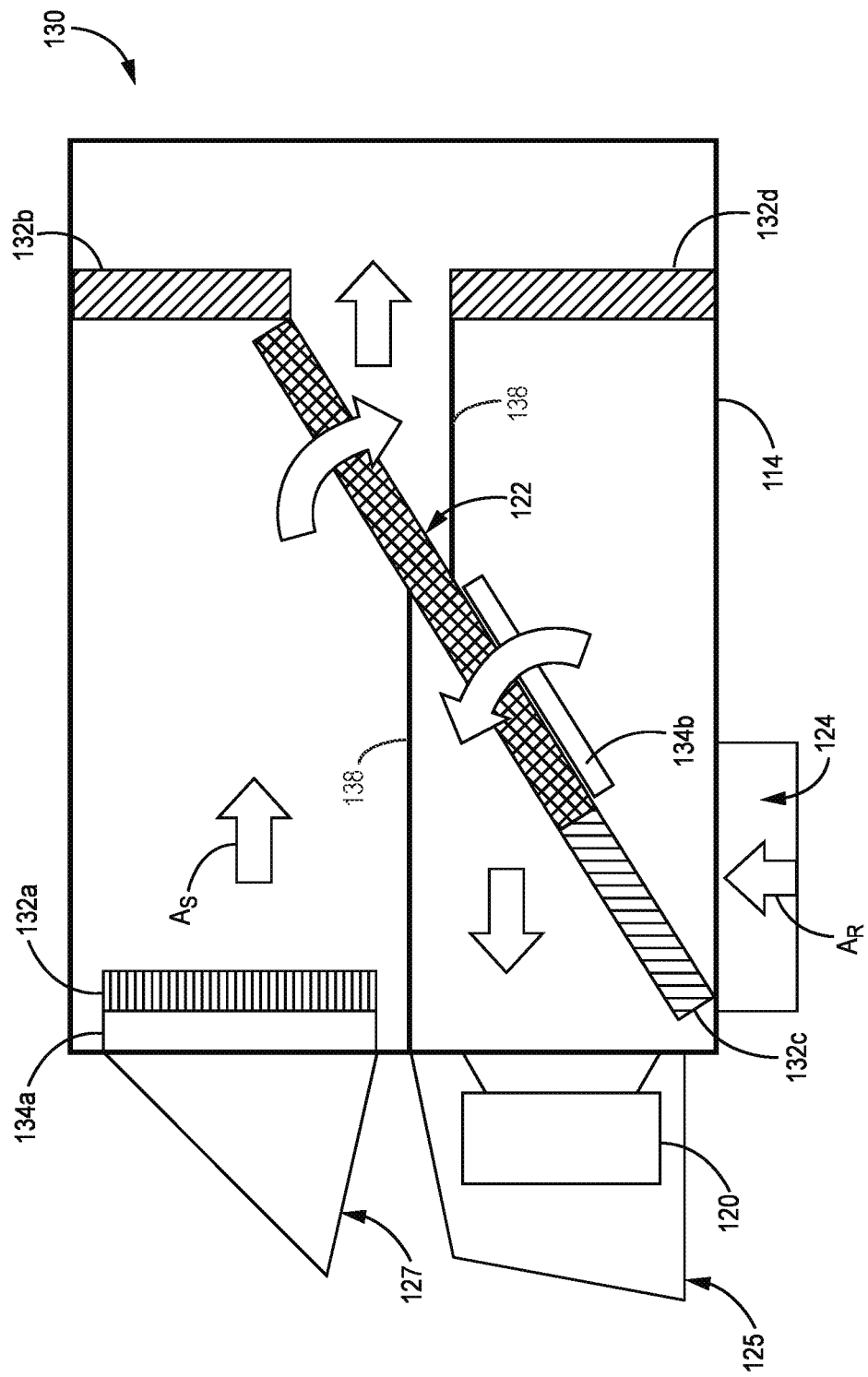
FIG. 3 is a schematic illustration of an exemplary ERV system, including the energy recovery wheel of FIG. 2A, in an energy recovery mode within the modified rooftop HVAC unit of FIG. 1B.

FIG. 3 is a schematic illustration of exemplary ERV system 130 within modified HVAC unit 100. As shown, ERV system 130 can include cabinet 114, supply fan 118 (not shown in FIG. 3), exhaust fan 120, energy recovery wheel 122, an energy recovery actuator (not shown), supply inlet damper 132a, supply outlet damper 132b, exhaust outlet damper 132c, return outlet damper 132d, and filters 134a-134b. ERV system 130 can additionally include a controller (not shown). Cabinet 114 can include walls 138 that define flow channels for outdoor air As and return air AR such that outdoor air As can flow along an outdoor air path and return air AR can flow along a return air path. It should be understood that ERV system 130 includes the components of modified HVAC unit 100 which allow for heat energy transfer to take place. As described in more detail below, ERV system 130 is in an energy recovery mode in FIG. 3.

Energy recovery wheel 122 can be positioned within cabinet 114 such that exhaust fan 120 is disposed downstream of energy recovery wheel 122 with respect to the return air stream, and supply fan 118 (not shown in FIG. 3) is disposed downstream of energy recovery wheel 122 with respect to the outdoor air stream. Supply fan 118 can be configured to draw a mix of outdoor air and return air through ERV system 130. The energy recovery actuator can be an active motor. The energy recovery actuator can drive the rotation of energy recovery wheel 122 about operational axis R-R (shown in FIGS. 2A-2B).

Supply inlet damper 132a is configured to allow outdoor air into ERV system 130 when opened, and can be located adjacent to supply inlet 127 and filter 134a. Supply inlet damper 132a can thereby direct the outdoor air stream into cabinet 114 through supply inlet 127. Supply outlet damper 132b is configured to allow outdoor air out of ERV system 130 when opened, and can be located adjacent to filter section 106. Supply outlet damper 132b can thereby direct the outdoor air stream out of ERV system 130 and into, for example, filter section 106. The outdoor air can then travel through modified HVAC unit 100 and be conditioned. Supply outlet damper 132b can allow outdoor air to bypass energy recovery wheel 122, and can thereby direct outdoor air away from (i.e., around) energy recovery wheel 122 when opened. Exhaust outlet damper 132c is configured to allow return air out of ERV system 130, and can be located adjacent to exhaust outlet 125. Exhaust outlet damper 132c can thereby direct the return air stream out of cabinet 114 through exhaust outlet 125. Exhaust outlet damper 132c can allow return air to bypass energy recovery wheel 122, and can thereby direct return air away from (i.e., around) energy recovery wheel 122 when opened. Return outlet damper 132d is configured to allow return air out of ERV system 130 when opened, and can be located adjacent to filter section 106. Return outlet damper 132d can thereby direct the return air stream out of ERV system 130 (away from return inlet 124) and into, for example, filter section 106. The return air can then travel through modified HVAC unit 100 and be reconditioned. Dampers 132a-132d (supply inlet damper 132a, supply outlet damper 132b, exhaust outlet damper 132c, and return outlet damper 132d) can be further configurable to vary the flow rate of outdoor air and/or return air flowing through ERV system 130 and cabinet 114, such that the mix of outdoor air and return air drawn by supply fan 118 is adjustable by the configuration of dampers 132a-132d.

Dampers 132b-132c (supply outlet damper 132b and exhaust outlet damper 132c) are configurable to direct air about ERV system 130. In particular, dampers 132b-132c can be configured to direct air to energy recovery wheel 122 when closed and configured to direct air away from (i.e., around) energy recovery wheel 122 when opened by providing a route for air to bypass energy recovery wheel 122. As described below, dampers 132b-132c can be configurable to not allow the outdoor air stream and the return air stream to bypass energy recovery wheel 122 when energy recovery wheel 122 is in operational mode, thereby facilitating heat transfer by energy recovery wheel 122 between the outdoor air stream and the return air stream. When supply outlet damper 132b is opened, the pressure drop across supply outlet damper 132b is lower than the pressure drop across energy recovery wheel 122. Similarly, when exhaust outlet damper 132c is opened, the pressure drop across exhaust outlet damper 132c is lower than the pressure drop across energy recovery wheel 122. The pressure drop across energy recovery wheel 122 is sufficiently great that energy recovery wheel 122 does not serve as a significant method of air bypass when supply outlet damper 132b and exhaust outlet damper 132c are open. It should be understood that, in some instances (such as the return air mode described below in reference to FIG. 6), return outlet damper 132d can serve to provide a bypass route for return air if exhaust outlet damper 132c is closed.

Energy recovery wheel 122 is mounted within cabinet 114 via a suitable attachment mechanism. As described below, energy recovery wheel 122 can have an operational mode and a bypass mode. These modes refer to the functioning of energy recovery wheel 122 during operation of modified HVAC unit 100.

Energy recovery wheel 122 can have an operational mode in which it transfers heat between the outdoor air stream and the return air stream. This can be achieved by, for example, closing dampers 132b-132c and thereby directing air in both the outdoor air stream and the return air stream about energy recovery wheel 122 by minimizing the bypass of the outdoor air stream and the return air stream around (i.e., not through) energy recovery wheel 122. When dampers 132b-132c are both closed, each cassette 128 (shown in FIGS. 2A-2B) successively rotates between the outdoor air stream and the return air stream. In the depicted example, energy recovery wheel 122 is in operational mode when both dampers 132b-132c are closed. The closing of dampers 132b-132c enables energy recovery wheel 122 to transfer heat energy and thereby to be in operational mode.

Energy recovery wheel 122 can have a bypass mode (depicted in FIGS. 4-6) in which it does not transfer heat between the outdoor air stream and the return air stream. This can be achieved by, for example, opening dampers 132b-132c and thereby directing air in both the outdoor air stream and the return air stream away from (i.e., around) energy recovery wheel 122 by allowing air to bypass energy recovery wheel 122. In the depicted example, energy recovery wheel 122 is in a bypass mode when both dampers 132b-132c are at least partially open. The opening of dampers 132b-132c minimizes the transfer of heat between the outdoor air stream and the return air stream by energy recovery wheel 122, and thereby allows energy recovery wheel 122 to be in bypass mode.

The controller can include a memory unit, one or more processors, and one or more communication devices. The memory unit can be configured to store information within the controller during operation, and can be a computer-readable storage medium which includes a non-transitory medium. The one or more processors can be configured to implement functionality and/or process instructions for execution within the controller. The one or more communication devices can be configured to communicate with external devices via one or more networks, such as one or more wireless or wired networks or both. The controller can additionally include components such as an input device, output device, sensor system, and/or power source.

The controller can be configured to receive and carry out instructions for the operation and configuration of components within modified HVAC unit 100. For example, the controller can be configured to select a position for each of dampers 132a-132d (supply inlet damper 132a, supply outlet damper 132b, exhaust outlet damper 132c, and return outlet damper 132d), thereby selecting a mode for modified HVAC unit 100 as described in more detail below. The controller can be further configured to select a mode of energy recovery wheel 122 (either operational mode or bypass mode). This selection of either operation mode or bypass mode can in turn adjust the corresponding dampers necessary for the selected mode. The controller can be configured to automatically detect conditions such as temperature and/or humidity inside and outside the building and carry out pre-determined instructions based on the detected conditions. Additionally and/or alternatively, the controller can be configured to carry out instructions from a user.

FIG. 3 depicts exemplary ERV system 130 in an energy recovery mode. As described in more detail below, modified HVAC unit 100 can be in either a mixed air mode or an outdoor air mode when ERV system 130 is in energy recovery mode. When ERV system 130 is in energy recovery mode, energy recovery wheel 122 is in an operational mode. While in operational mode, energy recovery wheel 122 can transfer heat between the outdoor air stream and the return air stream. In the example depicted in FIG. 3, supply outlet damper 132b, exhaust outlet damper 132c, and return outlet damper 132d are closed, and supply inlet damper 132a is open. Because dampers 132b-132c are closed, outdoor air can flow into filter section 106 without passing through supply outlet damper 132b, and return air can flow out of exhaust outlet 125 without passing through exhaust outlet damper 132c.

Figure 4:
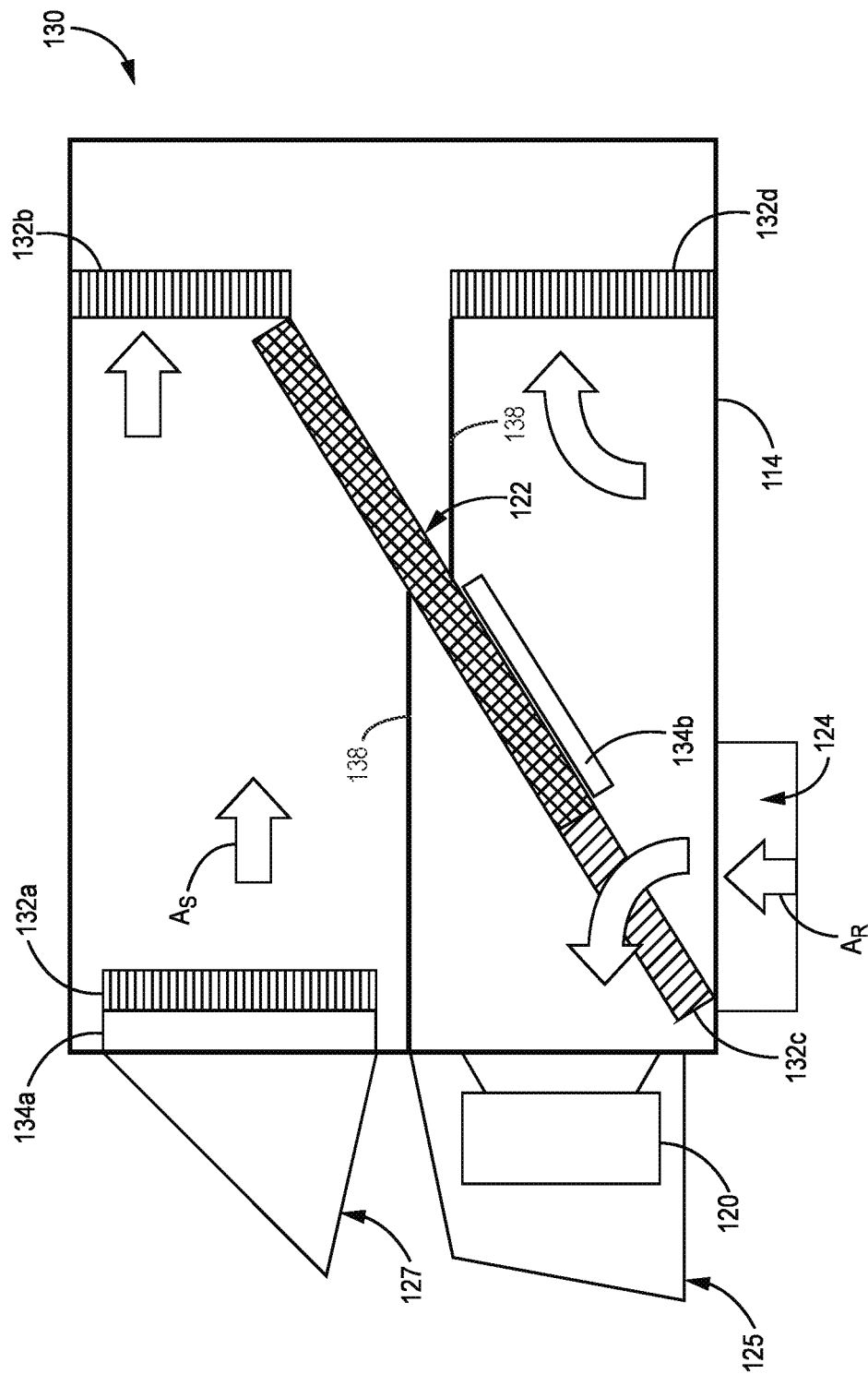
FIG. 4 is a schematic illustration of the ERV system of FIG. 3 when the modified rooftop HVAC unit of FIG. 1B is in a mixed air mode.

FIG. 4 is a schematic illustration of exemplary ERV system 130 while modified HVAC unit 100 (shown in FIG. 1B) is in a mixed air mode. FIG. 4 depicts energy recovery wheel 122 in a bypass mode such that it is not capable of transferring heat between the outdoor air stream and the return air stream (dampers 132b-132c are open).

When modified HVAC unit 100 is in mixed air mode, dampers 132a-132d are all at least partially open. This allows both outdoor air and indoor return air to flow through cabinet 114. Dampers 132a-132d are configurable to allow varying flow rates of outdoor air and/or indoor return air through cabinet 114. For example, when modified HVAC unit 100 is in mixed air mode, some of dampers 132a-132d can be completely open, and others of dampers 132a-132d can be partially open. This configuration can be varied as desired based on conditions such as outdoor air temperature and/or humidity.

Figure 5:
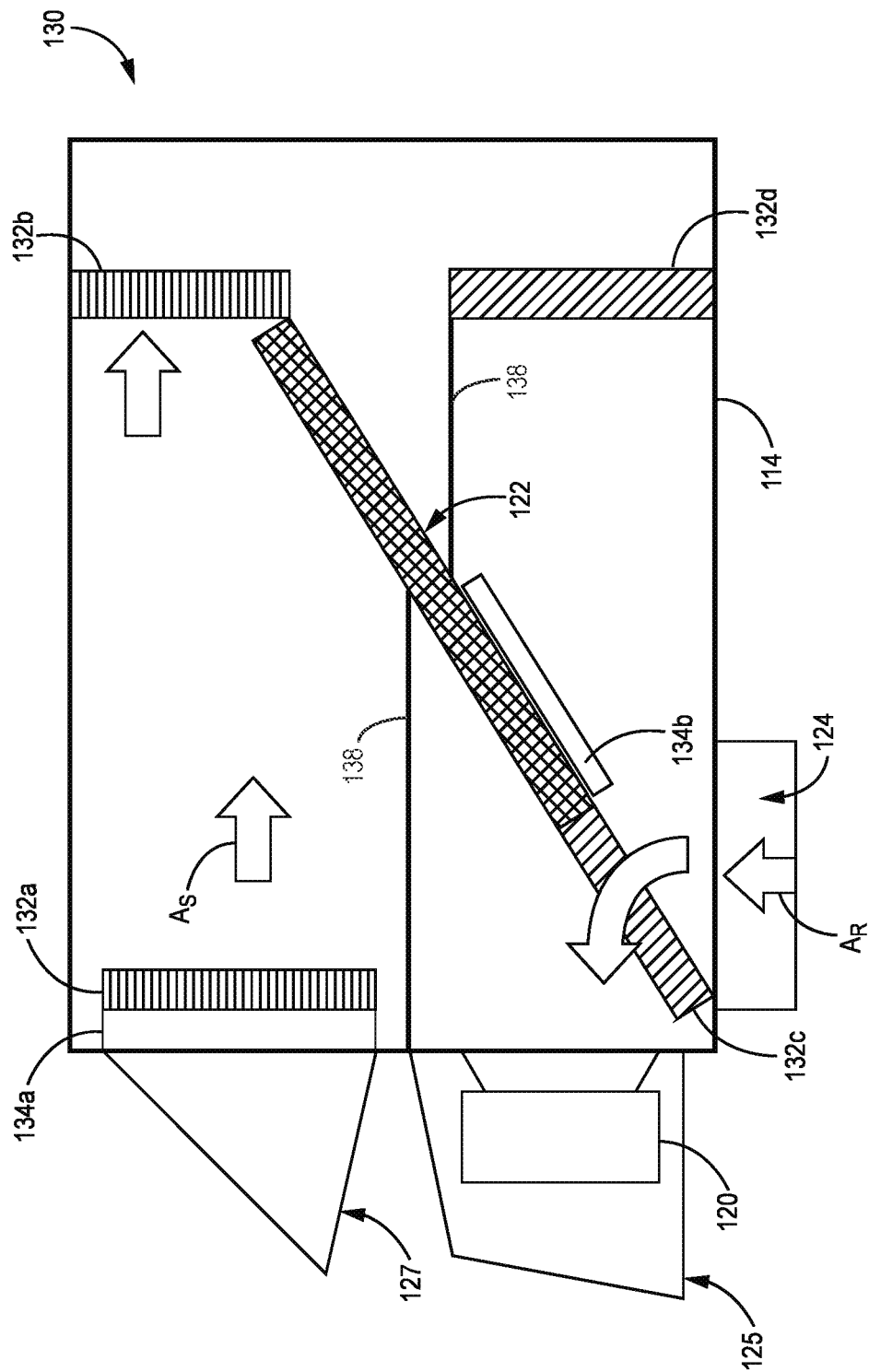
FIG. 5 is a schematic illustration of the ERV system of FIG. 3 when the modified rooftop HVAC unit of FIG. 1B is in an outdoor air mode.

FIG. 5 is a schematic illustration of exemplary ERV system 130 while modified HVAC unit 100 (shown in FIG. 1B) is in an outdoor air mode. In the example depicted in FIG. 5, energy recovery wheel 122 is in bypass mode. It should be understood that energy recovery wheel 122 can also be in operational mode while modified HVAC unit 100 is in outdoor air mode. While ERV system 130 is not shown in an energy recovery mode in FIG. 5, ERV system 130 can be in energy recovery mode while modified HVAC unit 100 is in outdoor air mode and energy recovery wheel 122 is in operational mode.

When modified HVAC unit 100 is in outdoor air mode, supply inlet damper 132a, supply outlet damper 132b, and exhaust outlet damper 132c are at least partially open, and return outlet damper 132d is closed. This allows exhaust fan 120 to exhaust indoor return air and supply fan 118 to draw in outdoor air. The closing of return outlet damper 132d prevents indoor return air from flowing back through modified HVAC unit 100 and causes the adjustable mix of outdoor air and return air drawn by supply fan 118 to be all outdoor air.

Figure 6:
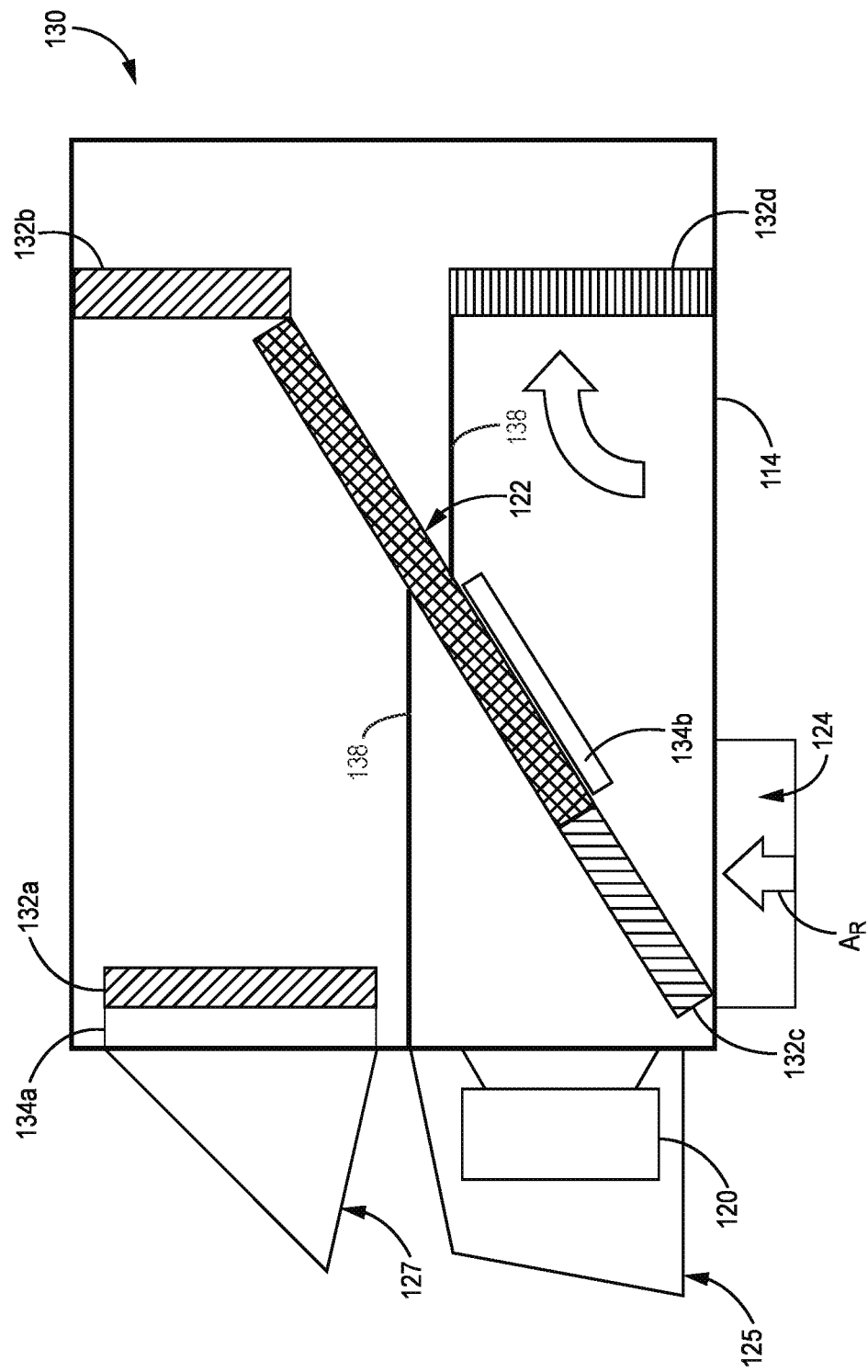
FIG. 6 is a schematic illustration of the ERV system of FIG. 3 when the modified rooftop HVAC unit of FIG. 1B is in a return air mode.

FIG. 6 is a schematic illustration of exemplary ERV system 130 while modified HVAC unit 100 (shown in FIG. 1B) is in a return air mode. In the example depicted in FIG. 6, energy recovery wheel 122 is in bypass mode. Energy recovery wheel 122 can be in bypass mode when modified HVAC unit 100 is in return air mode because there is no corresponding flow of outdoor air for heat transfer.

When modified HVAC unit 100 is in return air mode, supply inlet damper 132a, supply outlet damper 132b, and exhaust outlet damper 132c are closed, and return outlet damper 132d is at least partially open. This allows only indoor return air to flow through modified HVAC unit 100 such that the mix of outdoor air and return air drawn by supply fan 118 is all return air. It should be understood that, because in most operating modes buildings typically require at least some ventilation with outdoor supply air, return air mode may be infrequently used, but the disclosed modified HVAC unit 100 is capable of operating in a return air mode. Return air mode can be used in situations where, for example, extreme outdoor temperatures make drawing in outdoor air undesirable (such as extreme cold).

Figure 7:
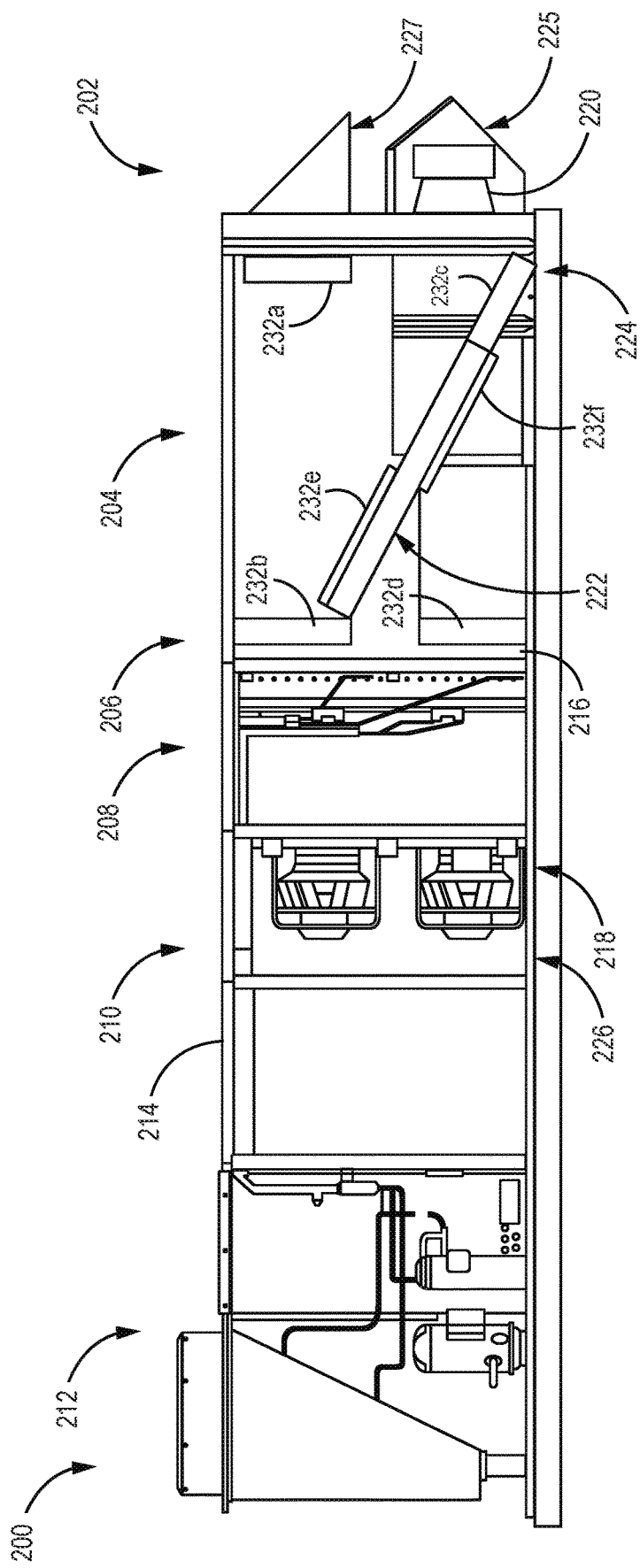
FIG. 7 is a cross-sectional view of an exemplary second embodiment of a modified rooftop HVAC unit including an ERV system.

FIG. 7 is a cross-sectional view of exemplary modified HVAC unit 200. Modified HVAC unit 200 is a rooftop HVAC unit which can include exhaust section 202, energy recovery section 204, filter section 206, evaporative coil section 208, supply/heating section 210, and condensing section 212. Modified HVAC unit 200 can include components such as cabinet 214, filters 216, supply fan 218, exhaust fan 220, and energy recovery wheel 222. Cabinet 214 can include return inlet 224, exhaust outlet 225, supply outlet 226, and supply inlet 227. As described in more detail below in reference to FIGS. 8-11, modified HVAC unit 200 can include supply inlet damper 232a, supply outlet damper 232b, exhaust outlet damper 232c, return outlet damper 232d, and energy recovery dampers 232e-232f, as well as filters 234a-234b (shown in FIGS. 8-11).

Modified HVAC unit 200 can operate in substantially the same way as prior art HVAC unit 10 and modified HVAC unit 100 with respect to ventilation. Modified HVAC unit 200 can have similarly resized or moved components as in modified HVAC unit 200, described above in reference to FIG. 1B. Energy recovery wheel 222 can operate in substantially the same way as energy recovery wheel 122. Modified HVAC unit 200 can be a vertical HVAC unit and can thereby utilize vertical return.

Figure 8:
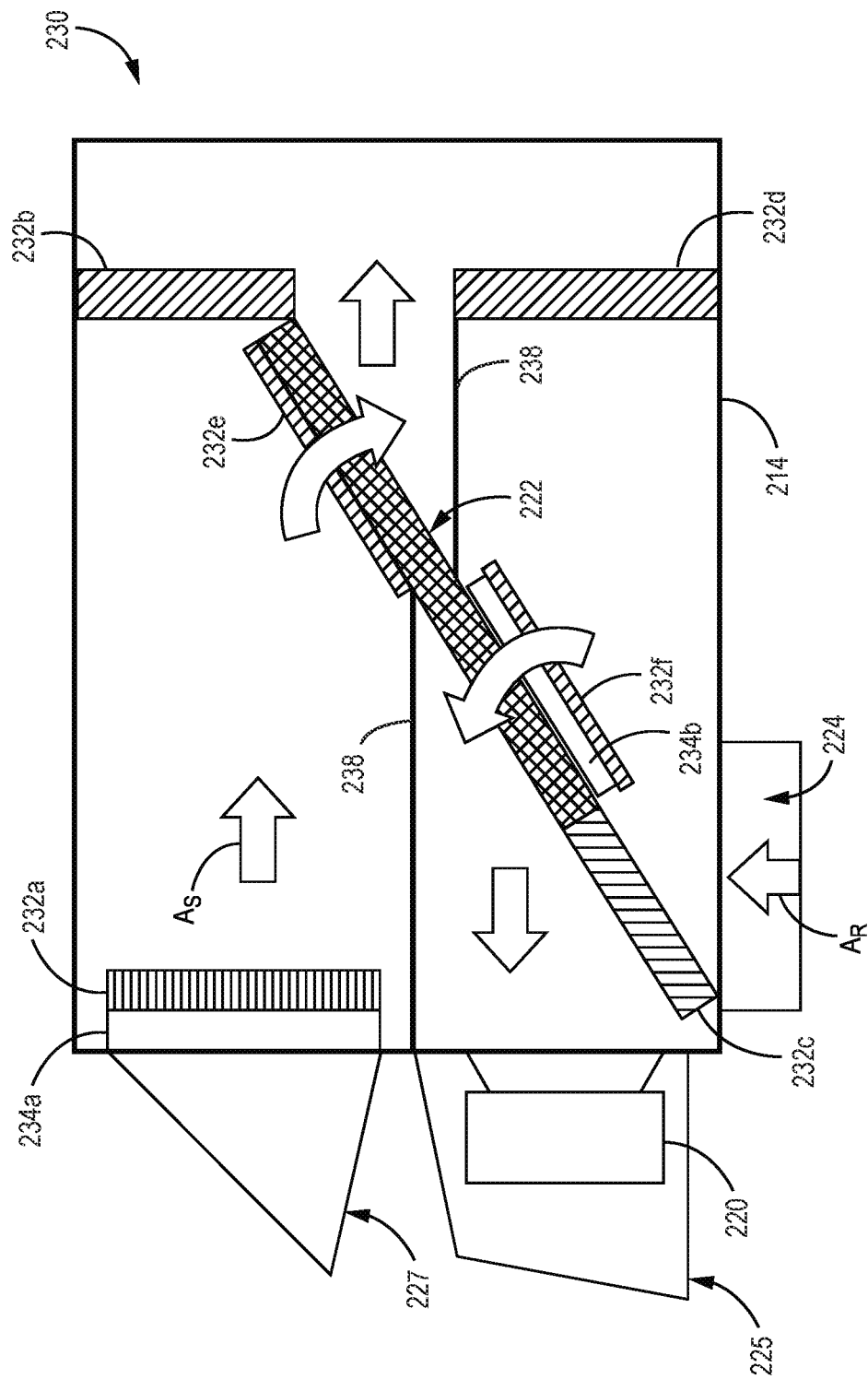
FIG. 8 is a schematic illustration of the ERV system of FIG. 7 when the modified HVAC unit of FIG. 7 is in an energy recovery mode.

FIG. 8 is a schematic illustration of exemplary ERV system 230 within modified HVAC unit 200. As shown, ERV system 230 can include cabinet 214, supply fan 218 (not shown in FIG. 8), exhaust fan 220, energy recovery wheel 222, an energy recovery actuator (not shown), supply inlet damper 232a, supply outlet damper 232b, exhaust outlet damper 232c, return outlet damper 232d, energy recovery dampers 232e-232f, and filters 234a-234b. ERV system 230 can additionally include a controller (not shown). Cabinet 214 can include walls 238 that define flow channels for outdoor air As and return air AR such that outdoor air As can flow along an outdoor air path and return air AR can flow along a return air path. It should be understood that ERV system 230 includes the components of modified HVAC unit 200 which allow for heat energy transfer to take place. As described in more detail below, ERV system 230 is in an energy recovery mode in FIG. 8.

Energy recovery wheel 222 can be positioned within cabinet 214 such that exhaust fan 220 is downstream of energy recovery wheel 222 with respect to the return air stream, and supply fan 218 (not shown in FIG. 8) is downstream of energy recovery wheel 222 with respect to the outdoor air stream. Supply fan 218 can be configured to draw a mix of outdoor air and return air through ERV system 230. The energy recovery actuator can be an active motor. The energy recovery actuator can drive the rotation of energy recovery wheel 222 about an operational axis (similar to operational axis R-R shown in FIGS. 2A-2B).

Supply inlet damper 232a is configured to allow outdoor air into ERV system 230 when opened, and can be located adjacent to supply inlet 227 and filter 234a. Supply inlet damper 232a can thereby direct the outdoor air stream into cabinet 214 through supply inlet 227. Supply outlet damper 232b is configured to allow outdoor air out of ERV system 230 when opened, and can be located adjacent to filter section 206. Supply outlet damper 232b can thereby direct the outdoor air stream out of ERV system 230 and into, for example, filter section 206. The outdoor air can then travel through modified HVAC unit 200 and be conditioned. Exhaust outlet damper 232c is configured to allow return air out of ERV system 230, and can be located adjacent to exhaust outlet 225. Exhaust outlet damper can thereby direct the return air stream out of cabinet 214 through exhaust outlet 225. Return outlet damper 232d is configured to allow return air out of ERV system 230 when opened, and can be located adjacent to filter section 206. Return outlet damper 232d can thereby direct the return air stream out of ERV system 230 (away from return inlet 224) and into, for example, filter section 206. The return air can then travel through modified HVAC unit 200 and be reconditioned. Dampers 232a-232d (supply inlet damper 232a, supply outlet damper 232b, exhaust outlet damper 232c, and return outlet damper 232d) can be further configurable to vary the flow rate of outdoor air and/or return air flowing through ERV system 230 and cabinet 214, such that the mix of outdoor air and return air drawn by supply fan 218 is adjustable by the configuration of dampers 232a-232d.

Energy recovery dampers 232e-232f are configurable to direct air about ERV system 230. In particular, energy recovery dampers 232e-232f can be configured to allow air to contact energy recovery wheel 222 when opened and configured to direct air away from (i.e., around) energy recovery wheel 222 when closed. As described below, energy recovery dampers 232e-232f can allow the outdoor air stream and the return air stream to contact energy recovery wheel 222 when energy recovery wheel 222 is in operational mode, thereby facilitating heat transfer by energy recovery wheel 222 between the outdoor air stream and the return air stream. One of energy recovery dampers 232e-232f, such as energy recovery damper 232e, can be a supply energy recovery damper which is positioned proximate to the outdoor air stream. One of energy recovery dampers 232e-232f, such as energy recovery damper 232f, can be a return energy recovery damper which is positioned proximate to the return air stream and filter 234b.

Energy recovery wheel 222 is mounted within cabinet 214 via a suitable attachment mechanism. As described below, energy recovery wheel 222 can have an operational mode and a bypass mode. These modes refer to the functioning of energy recovery wheel 222 during operation of modified HVAC unit 200.

Energy recovery wheel 222 can have an operational mode in which it transfers heat between the outdoor air stream and the return air stream. This can be achieved by, for example, opening energy recovery dampers 232e-232f and thereby directing air in both the outdoor air stream and the return air stream about energy recovery wheel 222. When energy recovery dampers 232e-232f are both open, the outdoor air stream and the return air stream can contact energy recovery wheel 222. This places energy recovery wheel 222 in both the outdoor air path and the return air path, and each cassette of energy recovery wheel 222 (similar to cassettes 128 shown in FIGS. 2A-2B) successively rotates between the outdoor air stream and the return air stream. In the depicted example, energy recovery wheel 222 is in operational mode when both energy recovery dampers 232e-232f are at least partially open. The opening of energy recovery dampers 232e-232f enables energy recovery wheel 222 to transfer heat energy between the outdoor air stream and the return air stream and thereby to be in operational mode.

Energy recovery wheel 222 can have a bypass mode (depicted in FIGS. 9-11) in which it does not transfer heat between the outdoor air stream and the return air stream. This can be achieved by, for example, closing energy recovery dampers 232e-232f and thereby directing air in both the outdoor air stream and the return air stream away from (i.e., around) energy recovery wheel 222. When energy recovery dampers 232e-232f are both closed, contact between energy recovery wheel 222 and both the outdoor air stream and return air stream is minimized. The closing of energy recovery dampers 232e-232f places energy recovery wheel 222 out of both the outdoor air path and the return air path. In the depicted example, energy recovery wheel 222 is in a bypass mode when both energy recovery dampers 232e-232f are closed. The closing of energy recovery dampers 232e-232f minimizes the transfer of heat by energy recovery wheel 222, and thereby allows energy recovery wheel 222 to be in bypass mode. It should be understood that energy recovery wheel 222 can be out of the outdoor air path and the return air path even when either outdoor air or return air is not actively flowing through ERV system 230 (i.e., when at least one of dampers 232a-232d is closed). In the depicted example, energy recovery dampers 232e-232f allow for air stream separation to be maintained when energy recovery wheel 222 is in either operational mode or bypass mode.

As described above, the controller can include a memory unit, one or more processors, and one or more communication devices. The controller can be configured to receive and carry out instructions for the operation and configuration of components within modified HVAC unit 200. For example, the controller can be configured to select a position for each of dampers 232a-232d (supply inlet damper 232a, supply outlet damper 232b, exhaust outlet damper 232c, and return outlet damper 232d), thereby selecting a mode for modified HVAC unit 200 as described in more detail below. The controller can be further configured to select a mode of energy recovery wheel 222 (either operational mode or bypass mode) and a position for each of energy recovery dampers 232e-232f (i.e., open or closed). The controller can be configured to automatically detect conditions such as temperature and/or humidity inside and outside the building and carry out pre-determined instructions based on the detected conditions. Additionally and/or alternatively, the controller can be configured to carry out instructions from a user.

FIG. 8 depicts exemplary ERV system 230 in an energy recovery mode. As described in more detail below, modified HVAC unit 200 can be in either a mixed air mode or an outdoor air mode when ERV system 230 is in energy recovery mode. When ERV system 230 is in energy recovery mode, energy recovery wheel 222 is in an operational mode. While in operational mode, energy recovery wheel 222 can transfer heat between the outdoor air stream and the return air stream. In the example depicted in FIG. 8, supply outlet damper 232b, exhaust outlet damper 232c, and return outlet damper 232d are closed, and supply inlet damper 232a and energy recovery dampers 232e-232f are open. Because energy recovery dampers 232e-232f are open, outdoor air can flow into filter section 206 without passing through supply outlet damper 232b, and return air can flow out of exhaust outlet 225 without passing through exhaust outlet damper 232c.

Figure 9:
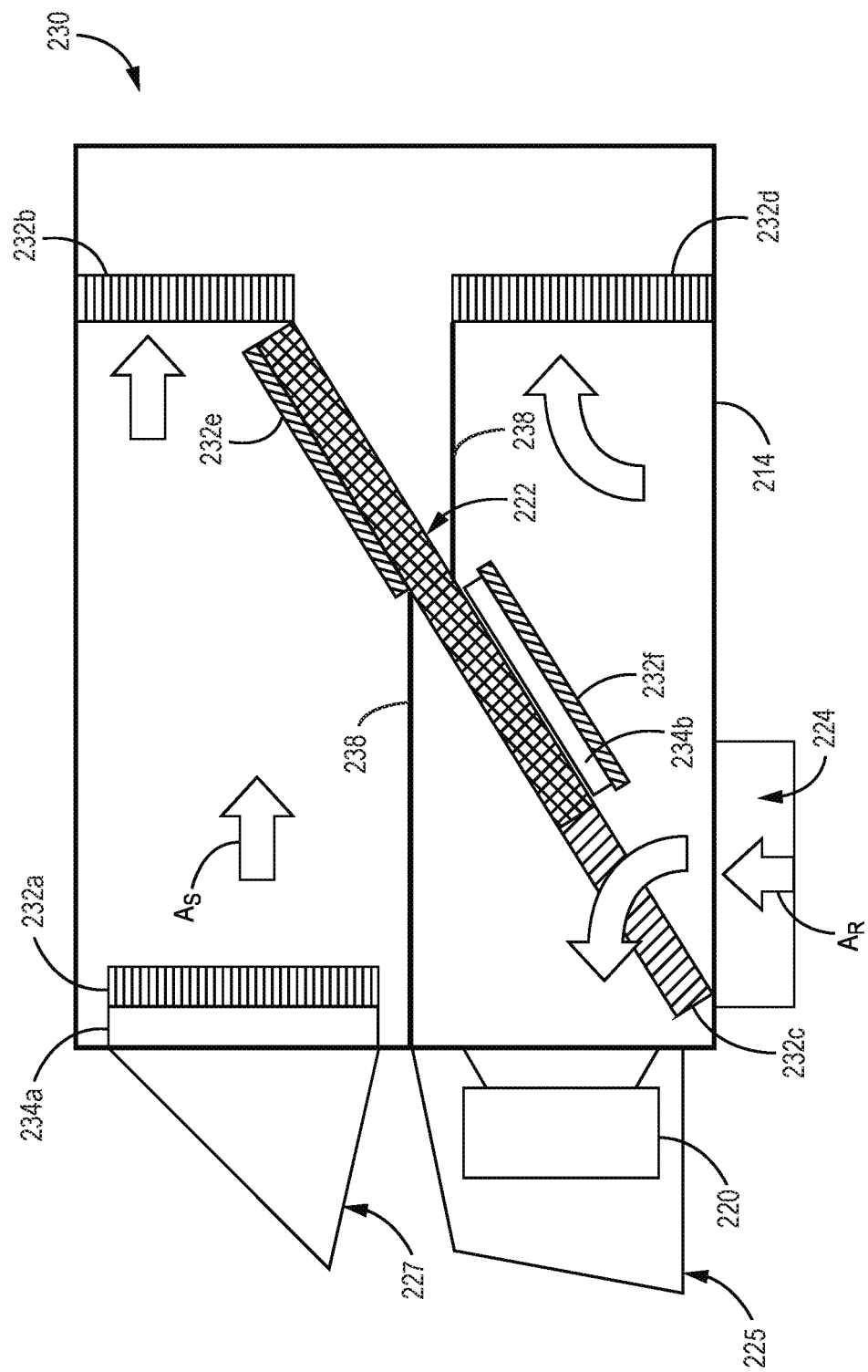
FIG. 9 is a schematic illustration of the ERV system of FIG. 7 when the modified HVAC unit of FIG. 7 is in a mixed air mode.

FIG. 9 is a schematic illustration of exemplary ERV system 230 while modified HVAC unit 200 (shown in FIG. 7) is in a mixed air mode. FIG. 9 depicts energy recovery wheel 222 in a bypass mode such that it is not capable of transferring heat between the outdoor air stream and the return air stream (energy recovery dampers 232e-232f are closed). It should be understood that energy recovery wheel 222 can also be in operational mode while modified HVAC unit 200 is in mixed air mode. While ERV system 230 is not shown in an energy recovery mode in FIG. 9, ERV system 230 can be in energy recovery mode while modified HVAC unit 200 is in mixed air mode and energy recovery wheel 222 is in operational mode.

When modified HVAC unit 200 is in the mixed air mode displayed in FIG. 9, dampers 232a-232d are all at least partially open. This allows both outdoor air and indoor return air to flow through cabinet 214. Dampers 232a-232d are configurable to allow varying flow rates of outdoor air and/or indoor return air through cabinet 214. For example, when modified HVAC unit 200 is in mixed air mode, some of dampers 232a-232d can be completely open, and others of dampers 232a-232d can be partially open. This configuration can be varied as desired based on conditions such as outdoor air temperature and/or humidity.

Figure 10:
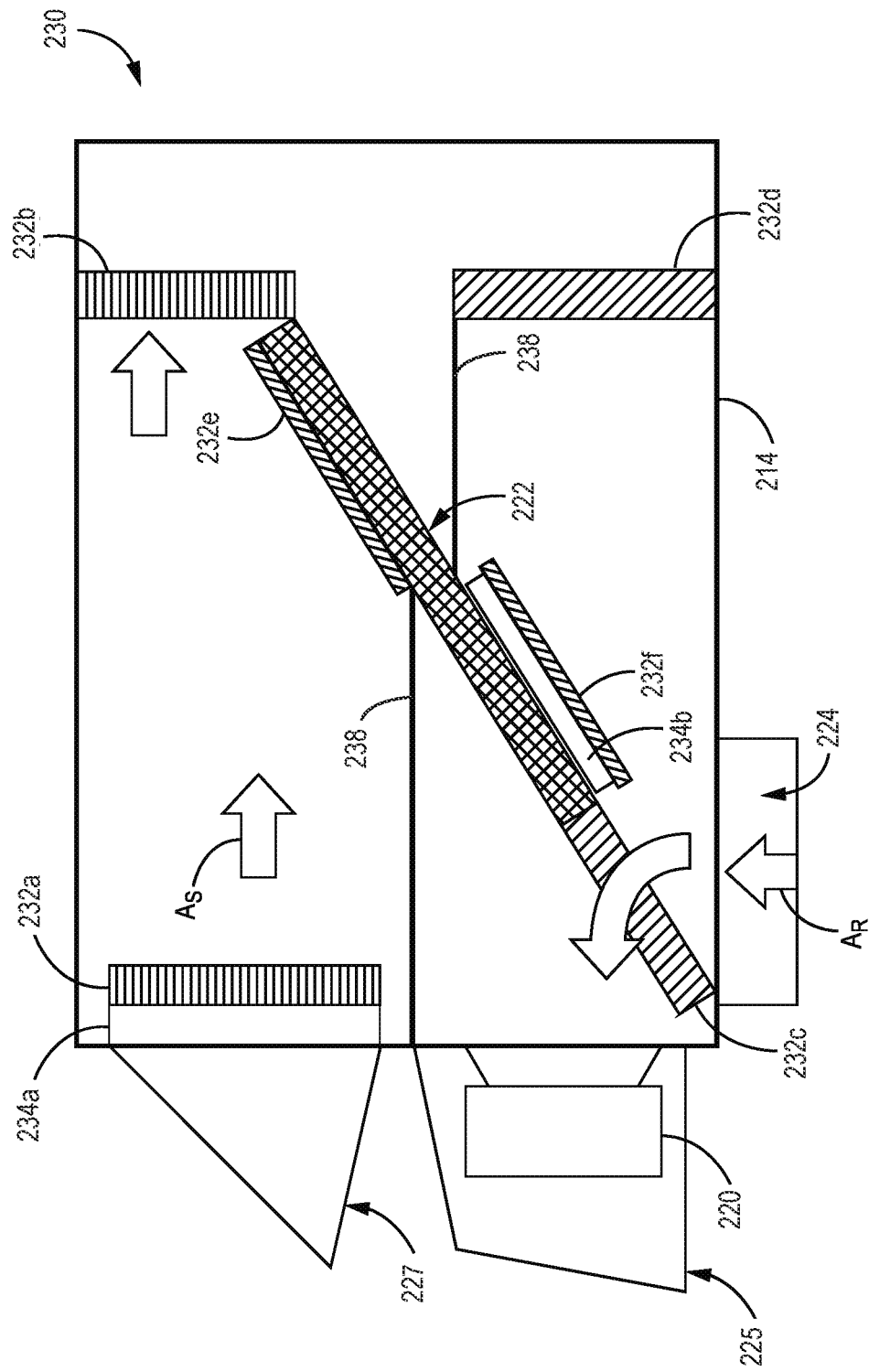
FIG. 10 is a schematic illustration of the ERV system of FIG. 7 when the modified HVAC unit of FIG. 7 is in an outdoor air mode.

FIG. 10 is a schematic illustration of exemplary ERV system 230 while modified HVAC unit 200 (shown in FIG.

7) is in an outdoor air mode. In the example depicted in FIG. 10, energy recovery wheel 222 is in bypass mode. It should be understood that energy recovery wheel 222 can also be in operational mode while modified HVAC unit 200 is in outdoor air mode. While ERV system 230 is not shown in an energy recovery mode in FIG. 10, ERV system 230 can be in energy recovery mode while modified HVAC unit 200 is in outdoor air mode and energy recovery wheel 222 is in operational mode.

When modified HVAC unit 200 is in outdoor air mode, supply inlet damper 232a, supply outlet damper 232b, and exhaust outlet damper 232c are at least partially open, and return outlet damper 232d is closed. This allows exhaust fan 220 to exhaust indoor return air and supply fan 218 to draw in outdoor air. The closing of return outlet damper 232d prevents indoor return air from flowing back through modified HVAC unit 200 and causes the adjustable mix of outdoor air and return air drawn by supply fan 218 to be all outdoor air.

Figure 11:
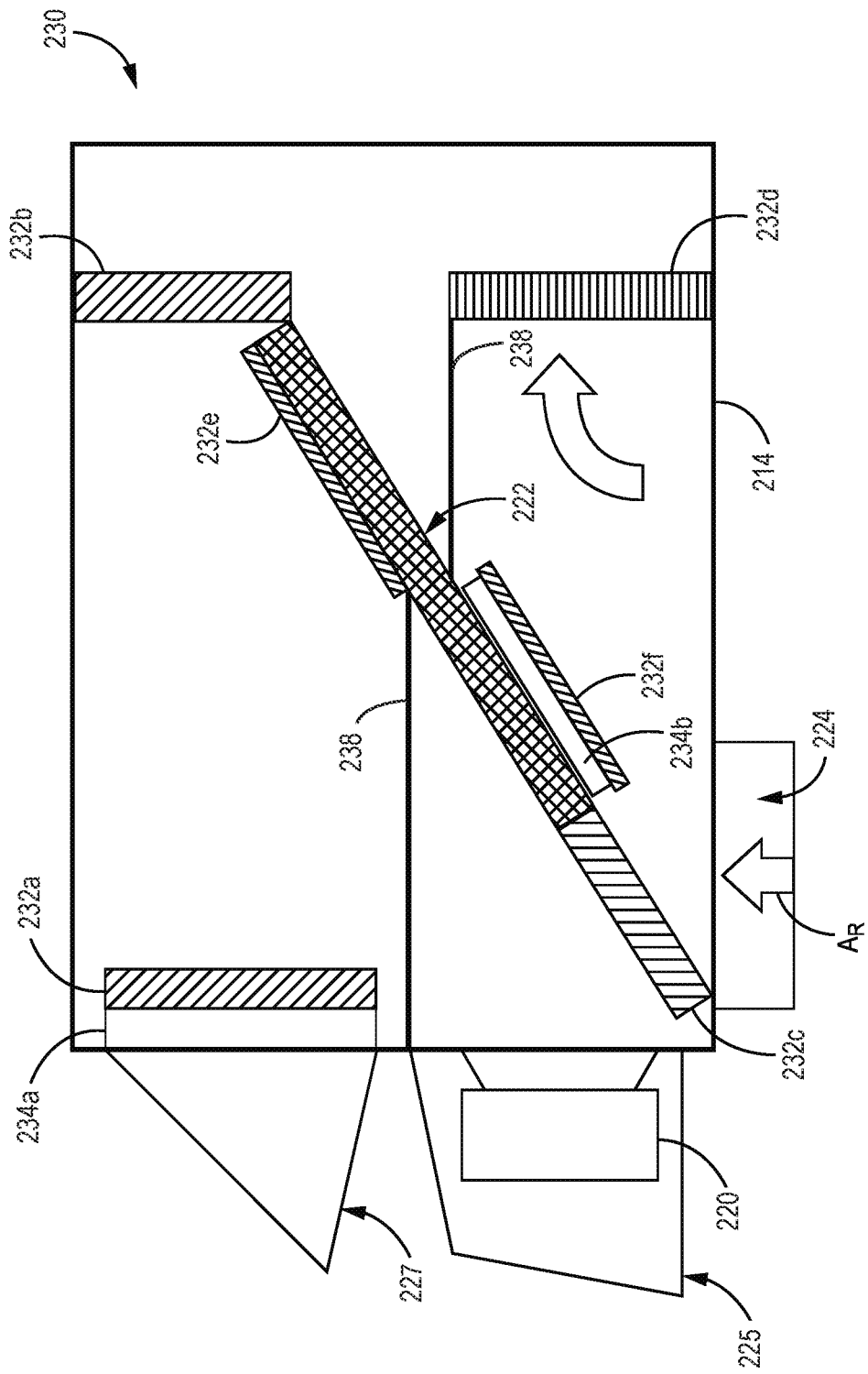
FIG. 11 is a schematic illustration of the ERV system of FIG. 7 when the modified HVAC unit of FIG. 7 is in a return air mode.

FIG. 11 is a schematic illustration of exemplary ERV system 230 while modified HVAC unit 200 (shown in FIG. 7) is in a return air mode. In the example depicted in FIG. 11, energy recovery wheel 222 is in bypass mode. Energy recovery wheel 222 can be in bypass mode when modified HVAC unit 200 is in return air mode because there is no corresponding flow of outdoor air for heat transfer.

When modified HVAC unit 200 is in return air mode, supply inlet damper 232a, supply outlet damper 232b, and exhaust outlet damper 232c are closed, and return outlet damper 232d is at least partially open. This allows only indoor return air to flow through modified HVAC unit 200 such that the mix of outdoor air and return air drawn by supply fan 218 is all return air. As discussed above in reference to FIG. 6, return air mode can be used in situations where, for example, extreme outdoor temperatures make drawing in outdoor air undesirable (such as extreme cold).

Incorporating an ERV system with an energy recovery wheel into a modified rooftop HVAC unit provides several advantages. An integral ERV system can capture heat energy which would otherwise be wasted and can improve energy efficiency, and an energy recovery wheel which can be rotated out of the way when not in use affords users flexibility. An ERV system which preserves bypass when not in use (for example, when the energy recovery wheel is in the bypass mode disclosed in this application) prevents a pressure drop across the HVAC system. Finally, resizing and rearranging components within the HVAC unit can allow the size of the cabinet to remain the same as an old cabinet. This decreases the cost to replace the unit and makes replacement easier by allowing an old cabinet to be entirely replaced with a new modified unit containing the ERV system.

It should be understood that the words "minimize" or "minimum", as used within this application, refer to a reduction in heat transfer or amount of air bypass such that the amount of remaining heat transfer or air bypass is negligible for the described system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rooftop heating, ventilation, and air conditioning (HVAC) unit comprising:
   a cabinet;
   an energy recovery wheel which is configured to be mounted within the cabinet, wherein the energy recovery wheel is configured to transfer heat between an outdoor air stream and a return air stream when in an operational mode and is further configured not to transfer heat between the outdoor air stream and the return air stream when in a bypass mode;
   a plurality of dampers configurable to direct the outdoor air stream and the return air stream through the rooftop HVAC unit, either through the energy recovery wheel or around the energy recovery wheel, wherein the plurality of dampers includes an exhaust outlet damper which is configured to allow the return air stream out of the energy recovery wheel through an exhaust outlet when opened; and
   a controller which is configured to adjust the plurality of dampers based on a selection between the operational mode and the bypass mode of the energy recovery wheel.

2. The rooftop HVAC unit of claim 1, further comprising an energy recovery actuator which is configured to rotate the energy recovery wheel about an operational axis of rotation.

3. The rooftop HVAC unit of claim 1, further comprising:
   a supply fan disposed downstream of the energy recovery wheel with respect to the outdoor air stream, the supply fan being configured to draw an adjustable mix of the outdoor air stream and the return air stream; and
   an exhaust fan disposed downstream of the energy recovery wheel with respect to the return air stream, the exhaust fan being configured to exhaust the return air stream.

4. The rooftop HVAC unit of claim 1, wherein the operational mode comprises a heating mode and a cooling mode, the heating mode being defined by the transfer of heat energy from the return air stream to the outdoor air stream, and the cooling mode being defined by the transfer of heat energy from the outdoor air stream to the return air stream.

5. The rooftop HVAC unit of claim 1, wherein the plurality of dampers is further configurable to direct the outdoor air stream and the return air stream away from the energy recovery wheel when the energy recovery wheel is in the bypass mode.

6. The rooftop HVAC unit of claim 1, wherein the plurality of dampers comprises:
   a supply inlet damper which is configured to allow the outdoor air stream into the rooftop HVAC unit when opened;
   a supply outlet damper which is configured to allow the outdoor air stream to bypass the energy recovery wheel when opened;
   the exhaust outlet damper which is further configured to allow the return air stream to bypass the energy recovery wheel when opened; and
   a return outlet damper which is configured to allow the return air stream to flow away from a return inlet when opened.

7. The rooftop HVAC unit of claim 1, wherein the plurality of dampers comprises:

a supply inlet damper which is configured to allow the outdoor air stream into the rooftop HVAC unit when opened;

a supply outlet damper which is configured to allow the outdoor air stream out of the energy recovery wheel when opened;

a return outlet damper which is configured to allow the return air stream to flow away from a return inlet when opened;

a supply energy recovery damper which is configured to allow the outdoor air stream to contact the energy recovery wheel when opened and to direct outdoor air away from the energy recovery wheel when closed; and a return energy recovery damper which is configured to allow the return air stream to contact the energy recovery wheel when opened and to direct return air away from the energy recovery wheel when closed.

8. The rooftop HVAC unit of claim 1, wherein the controller is further configured to select any of: an outdoor air mode of the rooftop HVAC unit, a return air mode of the rooftop HVAC unit, and a mixed air mode of the rooftop HVAC unit.

9. A method of operating a rooftop heating, ventilation, and air conditioning (HVAC) unit comprising an energy recovery wheel and a plurality of dampers, the method comprising:

selecting, with the controller, an operational mode of the energy recovery wheel wherein the plurality of dampers are configured to direct an outdoor air stream and an indoor air stream through the energy recovery wheel to transfer heat between the outdoor air stream and the return air stream; and selecting, with the controller, a bypass mode of the energy recovery wheel wherein the plurality of dampers are configured to direct the outdoor air stream and the indoor air stream around the energy recovery wheel to minimize the transfer of heat between the outdoor air stream and the return air stream;

wherein the plurality of dampers includes an exhaust outlet damper which is configured to allow the return air stream out of the energy recovery wheel through an exhaust outlet when opened.

10. The method of claim 9, wherein selecting the operational mode comprises closing at least one of the plurality of dampers to minimize the outdoor air stream and the return air stream from bypassing the energy recovery wheel, thereby enabling the energy recovery wheel to transfer heat energy between the outdoor air stream and the return air stream.

11. The method of claim 9, wherein selecting the operational mode comprises opening at least one of the plurality of dampers to allow the outdoor air stream and the return air stream to contact the energy recovery wheel, thereby enabling the energy recovery wheel to transfer heat energy between the outdoor air stream and the return air stream.

12. The method of claim 9, wherein selecting the bypass mode comprises opening at least one of the plurality of dampers to allow the outdoor air stream and the return air stream to bypass the energy recovery wheel, thereby minimizing the transfer of heat energy between the outdoor air stream and the return air stream.

13. The method of claim 9, wherein selecting the bypass mode comprises closing at least one of the plurality of dampers to minimize the outdoor air stream and the return air stream from directly contacting the energy recovery wheel, thereby minimizing the transfer of heat energy between the outdoor air stream and the return air stream.

14. The method of claim 9, further comprising selecting, with the controller, any of:

an outdoor air mode of the rooftop HVAC unit, wherein selecting, with the controller, the outdoor air mode comprises configuring the plurality of dampers to direct the flow of the outdoor air stream through the rooftop HVAC unit such that the supply fan draws outdoor air and an exhaust fan of the rooftop HVAC unit exhausts return air;

a mixed air mode of the rooftop HVAC unit, wherein selecting, with the controller, the mixed air mode comprises configuring the plurality of dampers to direct the flow of the outdoor air stream and the flow of the return air stream through the rooftop HVAC unit such that the supply fan draws outdoor air and return air; and a return air mode of the rooftop HVAC unit, wherein selecting, with the controller, the return air mode comprises configuring the plurality of dampers to direct the flow of the return air stream through the rooftop HVAC unit such that the supply fan draws return air.

15. A rooftop heating, ventilation, and air conditioning (HVAC) unit comprising:

a cabinet;

an energy recovery wheel which is configured to be mounted within the cabinet, wherein the energy recovery wheel is configured to transfer heat between an outdoor air stream and a return air stream when in an operational mode and is further configured not to transfer heat between the outdoor air stream and the return air stream when in a bypass mode;

a plurality of dampers configurable to direct the outdoor air stream and the return air stream through the rooftop HVAC unit, either through the energy recovery wheel or around the energy recovery wheel, wherein the plurality of dampers comprises:

a supply inlet damper which is configured to allow the outdoor air stream into the rooftop HVAC unit when opened;

a supply outlet damper which is configured to allow the outdoor air stream out of the energy recovery wheel when opened;

an exhaust outlet damper which is configured to allow the return air stream out of the energy recovery wheel through an exhaust outlet when opened;

a return outlet damper which is configured to allow the return air stream to flow away from a return inlet when opened;

a supply energy recovery damper which is configured to allow the outdoor air stream to contact the energy recovery wheel when opened and to direct outdoor air away from the energy recovery wheel when closed; and a return energy recovery damper which is configured to allow the return air stream to contact the energy recovery wheel when opened and to direct return air away from the energy recovery wheel when closed.

a controller which is configured to adjust the plurality of dampers based on a selection between the operational mode and the bypass mode of the energy recovery wheel.

16. The rooftop HVAC unit of claim 15, further comprising:

a supply fan disposed downstream of the energy recovery wheel with respect to the outdoor air stream, the supply fan being configured to draw an adjustable mix of the outdoor air stream and the return air stream; and an exhaust fan disposed downstream of the energy recovery wheel with respect to the return air stream, the exhaust fan being configured to exhaust the return air stream.

17. The rooftop HVAC unit of claim 15, further comprising an energy recovery actuator which is configured to rotate the energy recovery wheel about an operational axis of rotation.

18. The rooftop HVAC unit of claim 15, wherein the operational mode comprises a heating mode and a cooling mode, the heating mode being defined by the transfer of heat energy from the return air stream to the outdoor air stream, and the cooling mode being defined by the transfer of heat energy from the outdoor air stream to the return air stream.

19. The rooftop HVAC unit of claim 15, wherein the plurality of dampers is further configurable to direct the outdoor air stream and the return air stream away from the energy recovery wheel when the energy recovery wheel is in the bypass mode.

20. The rooftop HVAC unit of claim 15, wherein the controller is further configured to select any of: an outdoor air mode of the rooftop HVAC unit, a return air mode of the rooftop HVAC unit, and a mixed air mode of the rooftop HVAC unit.

* * * * *